H. N. TYSON.
SUBTERRANEAN BROADCASTER.
APPLICATION FILED DEC. 21, 1917.
1,273,694.
Patented July 23, 1918.
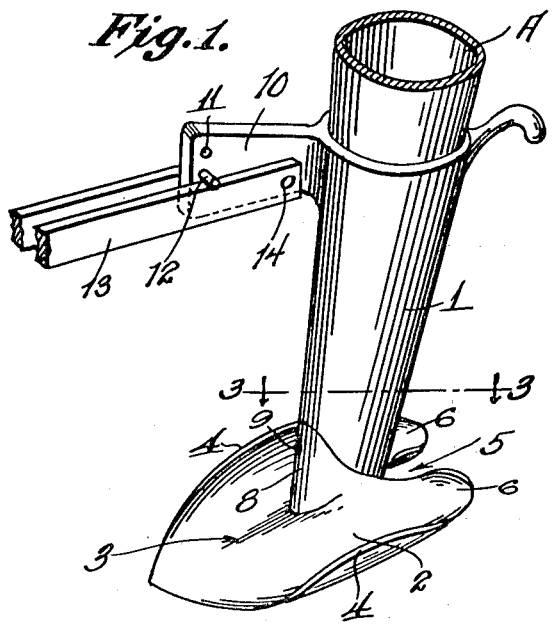
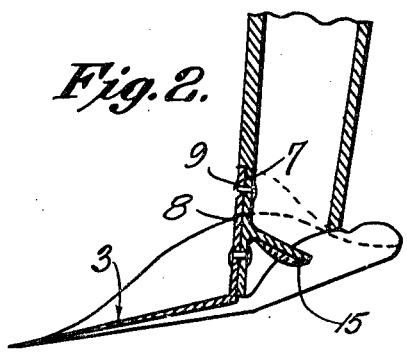
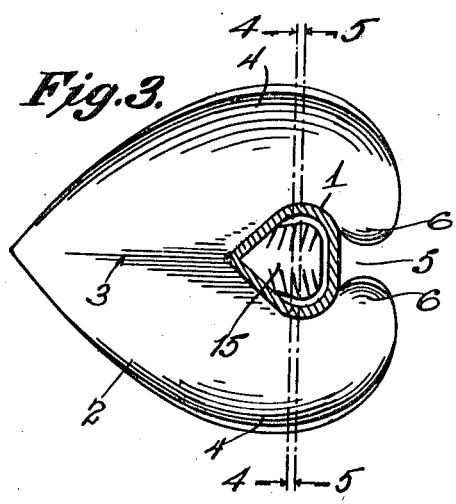
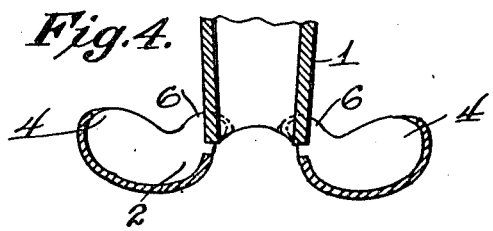
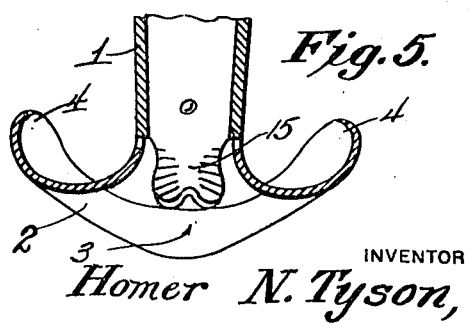
WITNESSES
James F. Crown,
Wm. A. Mulligan
INVENTOR
Homer N. Tyson,
BY Richard B. Owen,
ATTORNEY

UNITED STATES PATENT OFFICE.

HOMER N. TYSON, OF DAVENPORT, WASHINGTON.

SUBTERRANEAN BROADCASTER.

1,273,694.  Specification of Letters Patent.  Patented July 23, 1918.

Application filed December 21, 1917. Serial No. 208,267.

*To all whom it may concern:*

Be it known that I, HOMER N. TYSON, a citizen of the United States, residing at Davenport, in the county of Lincoln and State of Wa ington, have invented certain new and useful Improvements in Subterranean Broadcasters, of which the following is a specification.

This invention relates to broad casters and more particularly to a subterranean broad caster and is to be distinguished from my surface type of broad caster set forth in an application filed Dec. 3, 1917, bearing Serial #205,172.

This form of broad caster is designed to raise the soil from a point considerably below the surface and cast the seed in the soil at a relatively great depth; the shovel being designed to operate entirely beneath the surface of the earth.

One of the objects of this invention is to provide a shovel operating through the earth in a manner that will cause the soil to be raised so that the seeds may be cast at a point considerably below the earth's surface; the shovel being designed to permit the earth to readily move thereover so that the progress of the shovel through the earth is not hindered or retarded and thereby facilitating its movement through the soil.

The invention also aims at the provision of an improved subterranean broad caster adapted to evenly distribute seeds below the surface of the ground so that germination of practically all of the seeds will be brought about.

A further object of this invention is the provision of a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings wherein is illustrated the preferred form of my invention, in which:—

Figure 1 is a perspective view of the attachment as applied to an ordinary grain chute or seed tube.

Fig. 2 is a fragmentary vertical section.

Fig. 3 is a horizontal section taken on the line 3—3 of Fig. 1.

Fig. 4 is a transverse section taken on the line 4—4 of Fig. 3.

Fig. 5 is a transverse section taken on the line 5—5 of Fig. 3.

Referring to the drawings, wherein is illustrated the preferred form of my invention, in which like numerals of reference indicate corresponding parts throughout the several views, the seed tube 1 is attached to the tube A which depends from the feeder or grain planter with which the device is used, the seeds being supplied from a suitable source of supply. The seed tube 1 is tapered and has its lower end open as shown to advantage in Figs. 2, 4 and 5 of the drawing. This open end, is cut diagonally, however, so that the rearmost edge of the opening is disposed in a plane considerably higher than the foremost edge. This lower portion of the tube is of the shape shown in Fig. 3 of the drawing, the forward surface being substantially V-shaped in cross section thereby facilitating the passage of the tube through the earth when the device is in operation and in this connection it must be borne in mind that the shovel is attached to the lower end of the tube at a point considerably below the surface of the soil.

The particular formation of the shovel or blade 2 is of the utmost importance, inasmuch as its construction facilitates its easy passage through the soil and also assists in maintaining it in position beneath the earth's surface at the desired depth and has a tendency to overcome the inclination of the shovel to rise to the surface when the device is in use. The forward end of the shovel is pointed and the surface intervening between the end of the tube and the point of the shovel is inclined as indicated at 3 and it will be obvious that this forward portion may be of any desired length. From the point of the shovel, the sides are flared outwardly, and at their widest point the sides are curved upwardly to provide the opposite side flange 4. At its rear, the blade is bifurcated to provide the open space 5 and the rearwardly projecting portions 6 are curved slightly upwardly at each side of the space 5 to prevent the earth from lodging at the rear of the broad caster while it is in operation. It will be noted that these rearwardly projecting portions 6 are in a plane considerably above the inclined portion 3 of the shovel and are also above the plane in which the point of the tube 1 is disposed so that when the shovel is in operation, the earth displaced by the shovel will pass over the blade and drop over the rear extension while the seeds may be scattered in the space beneath the shovel and the end of the tube to be covered by the earth passing over the rear of the shovel. The upwardly curved flanges 4 cause the earth to be directed toward the center of the shovel at the rear thereof.

In order that the shovel may be rigidly attached to the lower end of the tube 1 I have provided the latter with a recess 7, while the shovel is provided with an integrally formed attaching plate, 8 curved to fit the V-shaped portion of the tube and which is attached thereto by the fastening elements 9 which may be of any preferred type.

At the top of the tube 1 and projecting therefrom is an arm 10 having its end provided with a plurality of vertically spaced openings 11 any one of which is adapted to receive a comparatively fragile pin 12. Pivotally connected to the arm 10 are the draw bars 13 and the pin 12 is adapted to overlie the draw bars so that the tendency of the tube to swing on the pivot 14 when the device is in operation, is prevented. The comparatively fragile pin, however, will break if the shovel strikes an immovable object in its path of movement and the tube and shovel are thereby permitted to swing on the pin 14 so that no injury is done to the device by the contact of the shovel with any object.

In order that the seeds may be evenly distributed, I have provided the seed casting element 15 which consists of a corrugated plate integrally formed with the lower open end of the seed tube. This plate is inclined as shown and projects toward and beneath the projection 6 and as shown in Fig. 5 of the drawing is shaped so that the seeds are scattered over the space beneath the shovel when it passes through the soil. Therefore, when the earth is raised by the inclined portion of the shovel and deflected toward the rear by the side flanges 4 it passes over the extension 6 and covers the seed scattered by the plate 15. It will be obvious that the plate 15 can be made detachable if desired.

From the foregoing it will be observed that a very simple and durable subterranean broad caster has been provided the details of which embody the preferred form. I desire it to be understood, however, that slight changes may be made in the minor details of construction without departing from the spirit of the invention or the scope of the claims hereunto appended.

I claim—

1. A broad caster of the character described comprising a seed tube, a shovel attached to the tube and having an inclined forward portion, the sides of the said shovel being curved upwardly and longitudinally to provide retaining flanges, and extensions formed on the rear of the shovel at opposite sides of the center thereof, the center of the shovel at the rear being bifurcated to provide an open space, and a seed casting element attached to the tube beneath the said open space.

2. A broad caster comprising a seed tube; a shovel attached to the tube and provided with a forwardly inclined portion at its center and upwardly and longitudinally curved side portions forming flanges, the rear of the said shovel being bifurcated to provide a central space at the rear of the said shovel, the lower end of the tube being cut diagonally, and a seed casting element attached to the said tube and projecting through the diagonally cut opening in the end thereof, and beneath the central space at the rear of the shovel.

3. A broad caster of the character described comprising a seed tube having its lower end cut diagonally and provided with a recess, a shovel carrying an attaching plate received in the said recess and attached to the tube, the said shovel having its sides curved upwardly to provide curved retaining flanges, and rearward extensions formed on the rear of the shovel and curved upwardly from their proximate edges and disposed in laterally spaced relation.

4. A broad caster of the character described comprising a seed tube having its lower end cut diagonally and provided with a recess, a shovel carrying an attaching plate received in the said recess and attached to the tube, the said shovel having its sides curved upwardly to provide curved retaining flanges, and rearward extensions formed on the rear of the shovel and curved upwardly from their proximate edges and disposed in laterally spaced relation, the said rear end of the shovel being bifurcated to provide an open space between the said rearwardly projecting portions, the latter being in a plane considerably higher than the foremost portion of the shovel, and a seed caster attached to open end of the tube at a point below the plane of the said rearwardly projecting portion of the shovel.

5. A broad caster of the character described comprising a seed tube, having its lower open end cut diagonally and of substantially V-shaped cross section, the said V-shaped portion having a recess, an attaching plate received in the said recess and secured to the said tube, a shovel carried by the attaching plate and including a forwardly inclined portion and having its sides curved upwardly and longitudinally for forming retaining flanges at opposite sides of the shovel, rearwardly projecting portions disposed rearwardly of the lower open end of the tube and in a plane considerably higher than the forward portion of the shovel, and a seed caster arranged in the open end of the tube and projecting toward and between the said rearwardly projecting portions of the shovel.

In testimony whereof I affix my signature in presence of two witnesses.

HOMER N. TYSON.

Witnesses:
GRACE WRIGHT,
FRED W. MOE.